US005390832A

United States Patent [19]

Lombardo

[11] Patent Number: 5,390,832

[45] Date of Patent: Feb. 21, 1995

[54] APPARATUS FOR DISPENSING A PRESSURIZED LIQUID

[76] Inventor: Samuel N. Lombardo, 1822 Fifth Ave., Arnold, Pa. 15068

[21] Appl. No.: 105,565

[22] Filed: Aug. 13, 1993

Related U.S. Application Data

[62] Division of Ser. No. 856,690, Mar. 24, 1992, Pat. No. 5,244,117.

[51] Int. Cl.[6] .................... B65D 83/00; B67D 5/60; F16K 47/00

[52] U.S. Cl. .................... 222/394; 222/464; 222/505; 215/4; 251/122; 251/331

[58] Field of Search .............. 222/394, 395, 396, 397, 222/398, 399, 400.7, 400.8, 464, 152, 190, 505, 511, 518, 509, 564; 251/122, 331, 335.2; 141/64, 20; 215/4, 5

[56] References Cited

U.S. PATENT DOCUMENTS

| | | | |
|---|---|---|---|
| 234,395 | 11/1880 | Dickey . | |
| 327,402 | 9/1885 | Malmstrom et al. | 215/5 |
| 417,336 | 12/1889 | Radvanyi | 215/5 |
| 462,576 | 11/1891 | Nadler | 215/5 |
| 502,451 | 8/1893 | Walter | 215/5 |
| 676,009 | 6/1901 | Ripper | 215/5 |
| 711,458 | 10/1902 | Bastian | 215/5 |
| 1,010,665 | 12/1911 | Miller . | |
| 1,235,418 | 7/1917 | Beach . | |
| 1,563,916 | 12/1925 | Nieberding . | |
| 2,006,688 | 7/1935 | Schmiedeknecht . | |
| 2,035,202 | 3/1936 | Smith . | |
| 2,119,383 | 5/1938 | Cornelius . | |
| 2,125,102 | 7/1938 | Cornelius . | |
| 2,162,842 | 6/1939 | Dolison et al. . | |
| 2,173,979 | 9/1939 | Picut . | |
| 2,176,947 | 10/1939 | Anagno . | |
| 2,234,816 | 3/1941 | Anagno . | |
| 2,236,619 | 4/1941 | Cornelius . | |
| 2,325,228 | 7/1943 | Cornelius . | |
| 2,575,658 | 11/1951 | Del Nero . | |
| 2,628,062 | 2/1953 | Weber . | |
| 2,633,150 | 3/1953 | Lewis . | |
| 2,661,019 | 12/1953 | Snyder et al. . | |
| 2,678,747 | 5/1954 | Caitung | 215/5 |
| 2,899,170 | 8/1959 | Cornelius | 251/122 |
| 2,924,238 | 2/1960 | Cornelius | 251/122 X |
| 2,928,576 | 3/1960 | Kochner | 222/394 |
| 3,194,533 | 7/1965 | McLay | 251/122 |

(List continued on next page.)

FOREIGN PATENT DOCUMENTS

| | | | |
|---|---|---|---|
| 0306379 | 3/1989 | European Pat. Off. | 141/64 |
| 2636918 | 3/1990 | France | 53/432 |
| 950077 | 2/1964 | United Kingdom . | |
| 1486245 | 9/1977 | United Kingdom . | |

OTHER PUBLICATIONS

The Wine Enthusiast, p. 20.

*Primary Examiner*—Kevin P. Shaver

[57] ABSTRACT

Carbonated and non-carbonated beverages are selectively dispensed under the driving force of a one time charge of pressurized inert gas inserted into the headspace of the beverage container at the time of bottling/canning. The gas, preferably nitrogen, is inert to the beverage liquid and is pressurized sufficiently to permit dispensing of all of the liquid from the container via a siphon tube. A cap valve seals the container and includes an elastomeric check valve preventing escape of gas while permitting the siphon tube to be inserted into the container. A throttling and diffusing valve controls outflow from the siphon tube to ambient and prevents fracturing of gas from the beverage liquid to minimize foaming/frothing. The valve has a conical valve member movable axially in a similarly conical valve chamber to establish a flow path having an annular cross-section that increases in circumference as the valve proceeds downstream to thereby gradually reduce the pressure of the liquid flowing through the valve to ambient pressure. A rounded tip on the upstream end of the valve member establishes a pressure stagnation point for the liquid entering the valve chamber. The resulting arrangement minimizes carbonation loss in the liquid so that it does not go flat as successive portions of the beverage are dispensed over long periods of time.

15 Claims, 6 Drawing Sheets

U.S. PATENT DOCUMENTS 3,238,963 3/1966 Witzel et al. .
3,291,441 12/1966 Hansen ................................ 251/122
3,410,456 11/1968 Johnson, Jr. et al. ....... 222/400.7 X
3,460,589 8/1969 Justis ....................................... 141/6
3,592,351 7/1971 Johnson, Jr. et al. ............ 222/82 X
3,823,848 7/1974 Schuster ....................... 222/400.7 X
3,830,265 8/1974 Matejek .................................. 141/6
3,998,364 12/1976 Hollander ....................... 222/394 X
4,000,829 1/1977 Johnson, Jr. et al. ....... 222/400.7 X
4,078,578 3/1978 Buchholz ........................ 251/122 X
4,194,653 3/1980 Brown ............................ 222/402.25
4,211,386 7/1980 Yocum et al. ....................... 251/122
4,347,695 9/1982 Zobel et al. ........................... 53/432
4,671,436 6/1987 Hagan ................................ 215/4 X
4,693,054 9/1987 Spargo ................................. 53/432
4,694,975 9/1987 Hagan .................................... 222/1
4,717,048 1/1988 Stenger ............................ 222/400.8
4,720,076 1/1988 Hyde .................................. 251/122
4,778,081 10/1988 Vaughan ............................ 222/83.5
4,784,299 11/1988 Stenger ........................ 222/400.7 X
4,860,932 8/1989 Nagy ............................... 222/402.1
4,867,348 9/1989 Dorfman ......................... 222/394 X
4,984,717 1/1991 Burton ............................ 222/464 X
4,995,534 2/1991 Norman .......................... 222/394 X
5,022,565 6/1991 Sturman et al. ................ 222/464 X
5,050,806 9/1991 Anderson et al. .................. 222/464
5,118,009 6/1992 Novitsky .............................. 222/81
5,244,117 9/1993 Lombardo ...................... 222/394 X FIG. 15
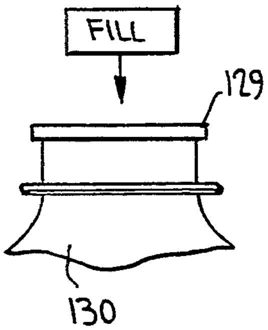
FIG. 16
APPLY CAP W/VALVE
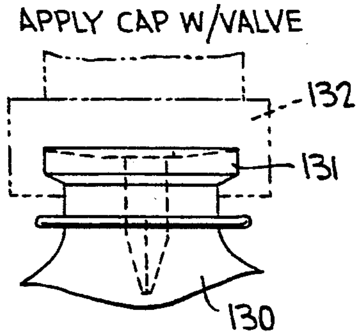
FIG. 17
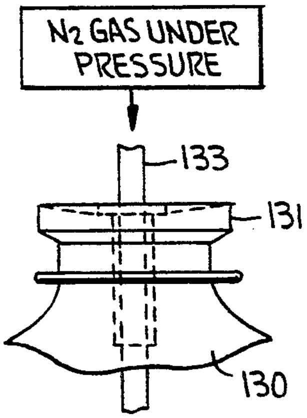
FIG. 18
ADD OVERCAP
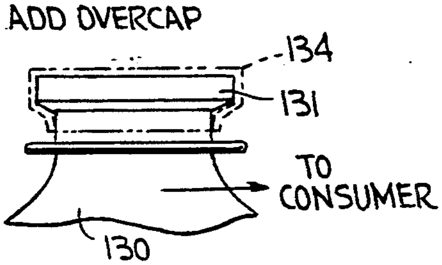
FIG. 19
REMOVE OVERCAP
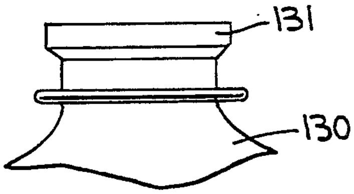
FIG. 20
INSTALL DISPENSER
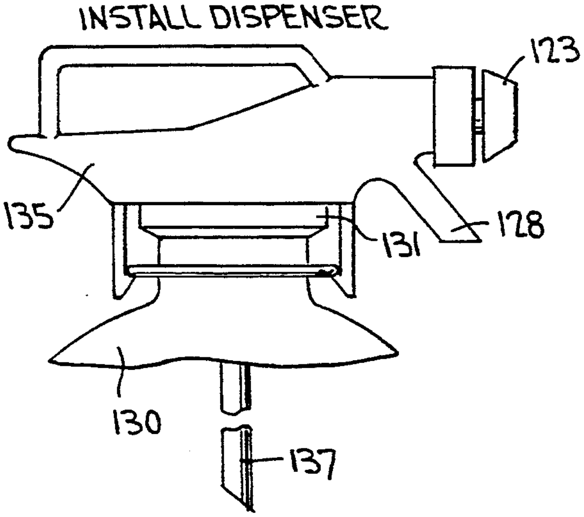
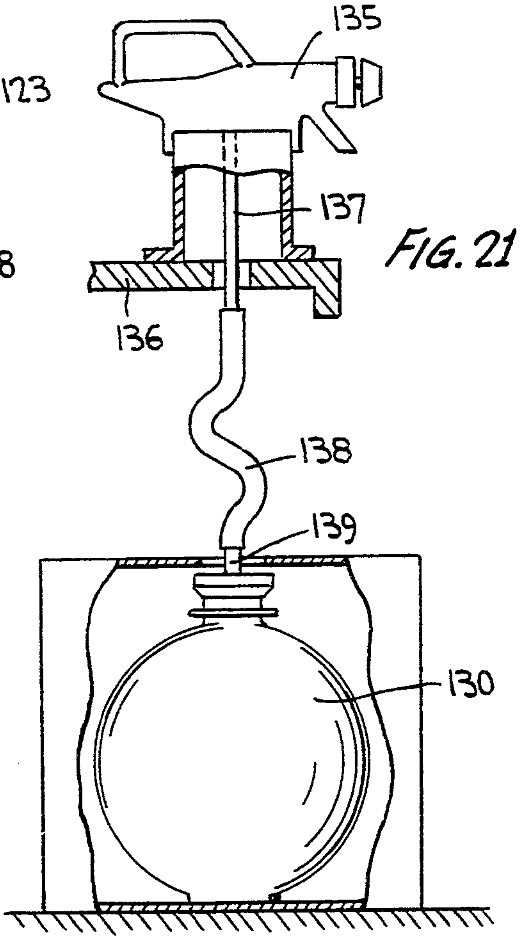
FIG. 21

APPARATUS FOR DISPENSING A PRESSURIZED LIQUID

This application is a divisional application of co-pending U.S. patent application Ser. No. 07/856,690, filed Mar. 24, 1992, now U.S. Pat. No. 5,244,117.

BACKGROUND OF THE INVENTION

1. Technical Field

The present invention pertains to methods and apparatus for storing and dispensing liquids, particularly beverages. Specifically, the invention comprises improved methods and apparatus for pressurizing potable liquids in their containers and selectively dispensing the liquids from those containers. Although the invention has particular utility in storing and dispensing carbonated beverages such as sodas, sparkling wines, beer, etc. in a manner preventing loss of carbonation in the beverage as it is dispensed, the invention is also of value in storing and dispensing non-carbonated beverages such as juice, tea, and the like.

2. Discussion of the Prior Art

Market studies conducted on behalf of the beer and carbonated soft drink industries have indicated a consumer preference for large volume packaging for these products. For example, two liter, three liter or even larger bottles or cans have been found to be desirable to consumers. In addition, large container packaging results in lower cost per unit volume of liquid sold, thereby resulting in savings for the consumer and higher profits for the manufacturer. The problem with large containers, however, is the loss of carbonation each time the container is opened to permit a portion of its contents to be poured. This loss of carbonation in the remaining beverage, colloquially referred to as the beverage going "flat", is generally unacceptable to consumers. In this regard acceptable carbonation volume levels for wine coolers and beers are approximately 2.0 to 2.6 volumes of $CO_2$ gas; for soft drinks and sparkling wine the acceptable range is approximately 4.0 to 5.0 volumes of dissolved $CO_2$ gas. (Note, here, that pursuant to common industry practice, fluid pressure is determined by the volume of the fluid at a given temperature). As containers sizes increase the number of times that the container is opened and closed for dispensing typically increases, resulting in a cumulative loss of carbonation pressure. Ultimately the carbonation pressure becomes negligible whereby the remaining beverage becomes "flat" and, accordingly, its taste is not acceptable. Having experienced this waste, consumers opt for smaller single serving containers in spite of their desire to have large containers. It is therefore desirable to provide a technique for maintaining the prescribed beverage carbonation pressure in a container until all 6f the beverage liquid has been dispensed.

In U.S. Pat. No. 4,194,653 (Brown) there is disclosed a dispensing apparatus and technique for carbonated beverages whereby, upon removal of the original sealing cap from a container, the apparatus is placed atop the container in sealing relation. A siphon tube extends to the bottom of the container and communicates with a dispensing nozzle via a selectively actuable valve. Pressure in the headspace (i.e., the space above the liquid level) is created by carbon dioxide leaving the liquid suspension. A user of the device is instructed to shake the container to bring additional carbon dioxide out of suspension to create the necessary headspace pressure to force the beverage up through the siphon tube. However, the use of the carbonation pressure in this manner reduces the carbonation pressure in the liquid to below acceptable taste levels. In addition, the valve arrangement between the siphon tube and the dispensing nozzle is formed by a selectively movable frusto-conical valve member seated in an O-ring. Movement of the valve member from its seat causes the pressurized liquid passing through the valve to experience a rapid change to ambient pressure from the pressure in the container. The result is a "fracturing" of the carbonated liquid, causing it to vigorously foam as it is dispensed. Thus, instead of primarily liquid being dispensed into a glass or cup, the glass or cup receives mostly foam. Moreover, the foaming process removes still more carbonation from the beverage, thereby further reducing its desirability for consumption.

A similar arrangement is disclosed in U.S. Pat. No. 4,860,932 (Nagy) wherein use of escaped carbonation pressure in the headspace to dispense the liquid, and fracturing of the carbonated liquid at the dispensing valve, combine to reduce the carbonation pressure of the dispensed liquid to below acceptable levels.

It is known in the prior art to initially bottle seltzer water in, and dispense it from, a sealed container having pressurized carbon dioxide in the headspace. A siphon tube conducts the seltzer water from the bottom of the container for selective dispensing under control of a valve mounted at the top of the container. The high pressure carbon dioxide (e.g., on the order of 5.0 to 6.0 volumes of dissolved $CO_2$) in the headspace is sufficient to dispense substantially the entire liquid contents of the container. U.S. Pat. No. 4,694,975 (Hagan) discloses a method and apparatus wherein a container is filled, shipped and sold to the consumer without the siphon and valve assembly, the latter being a separate reusable assembly adapted to be secured to the container by the consumer prior to dispensing liquid. In either case, when seltzer water is dispensed into a glass from a container using the methods and apparatus of the general type described above, the dispensed liquid experiences fracturing at the dispensing valve and loses much of its carbonation. Since seltzer water does not readily foam, the reduced pressure from fracturing may or may not suit different individual's tastes; however, for beer, cola and other flavored carbonated soft drinks, foaming and the loss of carbonation renders the beverage unacceptable for consumption.

It is desirable, therefore, to be able to dispense carbonated soft drinks, beer, and the like from the container in which it is bottled and shipped without significant loss of carbonation pressure.

Pinch point-causing turbulence in the dispensing valve noted above has adverse effects on certain non-carbonated beverages such as juices. Specifically, if certain fruit juices are agitated as dispensed by having to pass through pinch points in the valve, they tend to froth and fill the glass or other receptacle with foam. Although large dispensing containers for juices may not be in demand for many homes, commercial establishments such as restaurants and bars have a definite need to be able to store large volumes of juices in containers from which the liquid can be easily dispensed. Under such circumstances large amounts of foam in a customer's glass becomes totally unacceptable. It is desirable, therefore, to provide a technique for dispensing beverages whereby turbulence is substantially eliminated so that the dispensed beverage, carbonated or not, has no more foam than is produced by normal pouring of liquid from a small container.

Finally, it is known in the prior art to use nitrogen to pressurize the headspace in a bottle of still wine and in cans of other non-carbonated beverages. In the wine bottle case, a stopper for the bottle is permanently connected to a canister of pressurized nitrogen and includes a siphon tube, valve and spout to permit selective dispensing of the wine. Nitrogen is preferred to air for this purpose because the oxygen in air has deleterious effects on wine. This nitrogen canister technique may have value for still wine dispensing since removal of the cork and replacing it with a stopper does not have the problem of carbonation loss that would face beer, cola, etc. In addition, the use of a separate canister to dispense soft drinks or beer is totally impractical for most consumers and is less than desirable in most commercial establishments. In the case of beverage cans, nitrogen is used to purge deleterious oxygen from the headspace during packaging and is retained in the headspace at super atmospheric pressure after sealing to prevent collapse of the can when it is stacked during shipping and storage. An example of the latter arrangement is found in U.S. Pat. No. 4,347,695 (Zobel et al). Nothing in that patent is concerned with dispensing or preserving carbonation pressure.

OBJECTS AND SUMMARY OF THE INVENTION

It is therefore an object of the present invention to provide a method and apparatus for permitting carbonated beverages to be dispensed from the containers in which they are shipped and sold without significant loss of carbonation during the dispensing process.

It is another object of the present invention to provide a method and apparatus for pressurizing the headspace in a container of carbonated beverage in a manner to facilitate dispensing of the beverage from the container without significant loss of carbonation in the liquid remaining in the container.

A further object of the present invention is to dispense liquid stored under pressure by selective valve actuation without producing froth or foam in the dispensed liquid.

Yet another object of the present invention is to provide an improved valve structure for dispensing carbonated and non-carbonated beverages without significant fracturing of the dispensed liquid.

In accordance with the present invention, nitrogen is employed to pressurize the headspace in a beverage container at that time the container is filled with a beverage at the factory. A valve cap seals the top of the container and prevents escape of pressurized gas while permitting a siphon tube to later be inserted therethrough by the consumer. The siphon tube is part of a dispenser assembly structure that is placed by the consumer over the valve cap and includes a pouring spout and an actuable dispensing valve disposed between the siphon tube and spout. The unique dispensing valve serves to both throttle and diffuse egressing liquid to prevent fracturing, turbulence and carbonated liquid going to atmosphere too quickly, thereby, substantially eliminating frothing of the liquid. In the preferred embodiment the dispensing valve includes a conical valve member disposed concentrically in a similarly tapered conical valve chamber. The upstream tip of the valve member is rounded and positioned, when the valve is closed, to block the upper end of the siphon tube terminating at the upstream end of the valve chamber. To dispense the pressurized liquid, the valve body is moved axially downstream in the valve chamber. Pressurized liquid entering the valve chamber from the siphon tube initially impacts against the rounded upstream end of the valve body serving as a stagnation point for the entering flow. The liquid then flows through the diffusing flow restriction defined by the space between the valve body and the valve chamber wall. This flow restriction has an annular cross-section that gradually increases in size in a downstream direction, thereby preventing the egressing liquid from experiencing a sudden change from the container pressure to ambient pressure. Consequently, there is little or no fracturing or turbulence of the liquid and, accordingly, there is no foaming or frothing of liquid as it passes through the dispensing valve.

Nitrogen in the headspace expands as the liquid contents of the container are dispensed. The initial pressure of the nitrogen is selected to assure that there will be sufficient pressure to dispense the entire liquid contents of the container. In addition, the pressurized nitrogen in the headspace prevents a significant amount of carbon dioxide from leaving the liquid suspension, thereby assuring that the carbonated beverage remains in the desired carbonation pressure range until all of the liquid has been dispensed. The throttling and diffusing features of the valve also prevent frothing when juice or other non-carbonated beverages are dispensed.

BRIEF DESCRIPTION OF THE DRAWINGS

The above and still further objects, features and advantages of the present invention will become apparent upon consideration of the following detailed description of specific embodiments thereof, particularly when taken in conjunction with the accompanying drawings wherein like reference numerals and the various figures are utilized to designated like components, and wherein:

FIGS. 15–20, inclusive, are diagrammatic illustrations of respective steps in a filling, pressurizing, sealing and dispensing process according to the present invention;

FIG. 21 is a diagrammatic illustration of an alternative method of dispensing a beverage according to the present invention;

DESCRIPTION OF THE PREFERRED EMBODIMENTS

Figure 1:
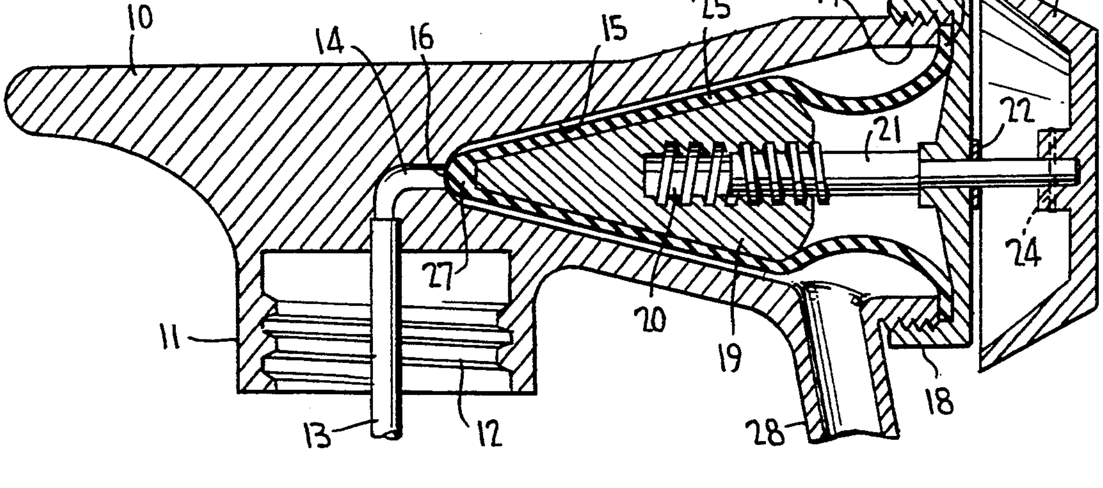
FIG. 1 is an elevational view in section of a dispenser assembly constructed in accordance with the present invention and suitable for use with a bottle of a beverage.

Referring specifically to FIG. 1 of the accompanying drawings, a dispensing assembly according to the present invention includes a head member 10 of plastic, aluminum, or other material suitable for the purposes described herein. The head member is adapted to be removably affixed to the top of a beverage container. For this purpose, head member 10 includes a depending bottle attachment cylinder 11 open at its lower end and internally threaded at 12 to engage the externally threaded neck of a bottle. A siphon tube 13 extends downwardly through attachment cylinder 11 and is secured by adhesive or the like in a suitably provided bore at the upper end of the attachment cylinder interior. In this position the upper end of siphon tube 13 communicates with one end of a flow passage 14 defined in head member 10. The other end of flow passage 14 terminates at an inlet port 16 defined at the upstream end of a generally conical valve chamber 15. Inlet port 16 is defined at the rounded narrow end of valve chamber 15 symmetrically about the longitudinal axis of the chamber; the chamber itself is also symmetrical about its longitudinal axis.

The downstream end of valve chamber 15 has a short generally cylindrical segment 17 that is exteriorly threaded to be engaged by an internally threaded cover 18. The cover is substantially cup-like in configuration and is provided at its closed end with a central through hole disposed concentrically about the longitudinal axis of the valve chamber 15.

A generally conical valve member 19 is movably supported in valve chamber 15 coaxially with the chamber, with the narrow end of member 19 facing the narrow end of the chamber. Valve member 19 is uniformly spaced from the surrounding walls of chamber 15 and is controllably movable along the longitudinal axis of the chamber. In order to provide such movability, the upstream or wide end of valve member 19 has a threaded bore 20 defined therein to a predetermined depth along the longitudinal axis of the valve chamber. The threaded interior of bore 20 is adapted to be engaged by the threaded distal end of a rotatable shaft 21 journaled in the through hole in cover 18. In this regard, shaft 21 has an enlarged diameter segment disposed in the valve chamber and a smaller diameter segment extending through the hole in cover 18. The transition between the larger and smaller diameter segments defines an annular shoulder abutting the interior surface of cover 18 to prevent axial withdrawal of shaft 21 from the valve chamber via the cover hole. At the outside surface of cover 18 there is provided a locking ring 22 or other structure such as a locking pin, etc., abutting cover 18 to prevent axial movement of shaft 21 inwardly toward the valve chamber. The proximal end of shaft 21 is secured to a control knob 23 or the like such as by a locking pin 24 in a manner to permit shaft 21 to be rotated about its longitudinal axis in response to rotation of knob 23 about that axis.

A generally conical hollow valve member liner 25 made of suitably soft and resilient plastic material, such as neoprene, is secured to valve member 19 by means of a suitable adhesive. The valve liner surrounds the upstream end and conical surface of the valve member in flush fitting relation. The open end of valve liner 25 located downstream of valve member 19 converges and then diverges in a downstream direction to increase the spacing between the liner and the wall of valve chamber 15. The open end 26 of liner 25 forms an annular lip that is compressed and engaged between cover 18 and the annular end of body member 10, thereby preventing rotation of liner 25 and valve member 19 about the valve chamber axis.

Rotation of knob 23 causes shaft 21 to rotate about its axis. Since valve member 19 and liner 25 are secured against rotation, rotation of shaft 21 causes the threaded end of shaft 21 to rotate relative to the threaded bore 20 in valve member 19. The valve member and its liner are thus caused to move axially in chamber 15 in response to rotation of knob 23 and shaft 21. The valve member is thus movable over a continuous range between two extreme positions, closed and fully open. In the closed position, the tip 27 of liner 25 is urged axially against valve inlet port 16 in sealing relation. In this regard, liner tip 27 is rounded and may be thicker than the remaining portions of the liner in order to provide reinforcement and durability to protect against wear from repeated compressions of the tip against the inlet port when the valve is closed. In the fully open position of the valve, the liner tip 27 is axially displaced downstream from inlet port 16 and permits flow through the inlet port into the valve chamber 15.

Valve chamber 15 is provided with a downwardly directed pour spout 28 having its proximal end communicating with the downstream end of the valve chamber. The preferred location of the proximal end of spout 28 is adjacent the portion of valve liner 25 where the liner converges on itself downstream of valve member 19.

Flow into the valve chamber via inlet port 16 initially impinges against the arcuate liner tip 27 in a symmetrical manner with the result that the liner tip serves as a stagnation point (i.e., a point where the velocity head is converted to pressure head). Downstream of tip 27 the flow passage is annular in transverse cross-section but gradually increases in area with increasing distance from the tip. Specifically, as flow moves downstream in the annular space between the walls of chamber 15 and valve member 19, the spacing between the walls remains the same but the annulus gradually increases in diameter. The flow through this gradually increasing area thus diffuses gradually after having been throttled at the stagnation point. Consequently, where conventional valves that are employed for dispensing seltzer water and other carbonated beverages serve only to throttle flow, the dispensing valve of the present invention first throttles flow and then diffuses the flow to avoid exposing the dispensed liquid to a sudden transition from the container pressure to ambient pressure. The diffused flow ultimately reaches the expanded space downstream of valve 19 and egresses from the valve chamber 15 via spout 28.

The output flow rate through spout 28 is determined by the pressure in the container (i.e., upstream of inlet port 16) and the positional setting of valve member 19 in the valve chamber. Typically, it is desirable that output flow rates for carbonated beverages be in the range of 1.5 to 2.0 ounces per second. As the dispensing pressure in the container gradually decreases with a decrease in the liquid contents of the container, it is possible to provide the desired flow rate by simply increasing the size of the valve opening. This is done by rotating knob 23 during a dispensing operation so that the valve member 19 is located further downstream, thereby increasing the spacing between the walls of chamber 15 and valve member 19.

Referring now to FIGS. 2 through 6, a bottle 30, suitable for transporting and storing beverages, includes an exteriorly threaded neck 31 adapted to be engaged by the threaded interior 12 of the head member attachment cylinder 11. Proximate the lower end of neck 31 there is an annular molding ring 29 protruding radially outward. An annular peripheral lip 32 surrounds and extends radially outward from the open top end of the bottle. The bottle may be made of glass or plastic and is preferably polyester terephthalate (PET), having a thickness of between eighteen and twenty mils. Whatever the thickness, it must be sufficient to withstand internal pressures. The liquid capacity of bottle 30 may be substantially any capacity suitable for transporting and storing beverages; however, the present invention is particularly advantageous for bottles of large capacity, such as two liters, three liters or even substantially larger.

A cap valve 33 is secured over the open end of bottle 30 in pressure sealing relation. In particular, cap valve 33 may be formed from a piece of yieldable sheet metal, or the like, having a circular top portion 34 of approximately the same diameter as the peripheral lip 32 of bottle 30. Depending from top portion 34 and extending circumferentially around the top portion is a peripheral skirt 35. The axial length of skirt 35 is somewhat greater than the axial length of bottle lip 32 so that the skirt initially extends below the bottle lip when cap valve 33 is placed over the open bottle end. Skirt 35 is cylindrically straight as originally formed but is crimped around the underside of the bottle lip after the bottle has been filled with beverage liquid at the bottling plant. In this respect, a suitable crimping unit 36 is partially illustrated in FIG. 5.

The circular top portion of the cap valve has a central hole defined therethrough and includes an annular inner skirt 37 surrounding and extending below that hole. A duck-bill valve 38 is sealingly secured within skirt 37 and depends into bottle neck 31. Valve 38 is made of resiliently yieldable elastomeric material such as rubber, plastic, or the like, and includes an annular flange 39 surrounding a cylindrical bore at its upper end. A hollow cylindrical section 40 depends from flange 39, also surrounding the bore, and has an outer diameter equal to or slightly larger than the inner diameter of inner skirt 37 to permit section 40 to be engaged by that skirt in press-fit relation. An annular stop 41 projects radially outward from cylindrical section 40 at a location axially spaced from top flange 39 by a distance corresponding to the axial length of inner skirt 37. The outer diameter of annular stop 41 is greater than the inner diameter of inner skirt 37. Once the duck-bill valve has been pressed into the cap valve through skirt 37, flange 39 abuts top portion 34 of the cap valve while stop 41 abuts the lower edge of skirt 37. As a consequence, the duck-bill valve 38 is prevented from moving axially relative to the remainder of the cap valve structure.

At an axial location below stop 41, the duck-bill valve tapers to define two separable flaps 42, 43 normally resiliently biased together in a planar seal that closes off the lower end of the hollow cylindrical section 40. That seal serves to pressure isolate the interior of bottle 30 from the ambient environment. The diameter of the hollow cylindrical interior of section 40 (i.e., the interior bore) is selected to permit siphon tube 13 (FIG. 1) to be inserted axially through duck-bill valve 38 without permitting pressurized fluid to escape from the container around the outside of the siphon tube. In this respect, the inner diameter of cylindrical section 40 is substantially equal to or slightly smaller than the outer diameter of the siphon tube to permit the siphon tube to be forced through the cylindrical section into the bottle interior.

Cap valve 33 serves to seal bottle 30 after the bottle is filled with liquid. In addition, by virtue of duck-bill valve 38, the cap valve permits a tube to be inserted into the bottle, either to charge the headspace with pressurized gas or to provide a dispensing passage such as siphon tube 13. However, in order to provide consumers with the option of not using dispensing head 10 but instead pouring the liquid directly from the bottle, top portion 34 of the cap valve may be scored to define a conventional tear away section 44 hinged at one diametric side of the cap valve.

Figure 2:
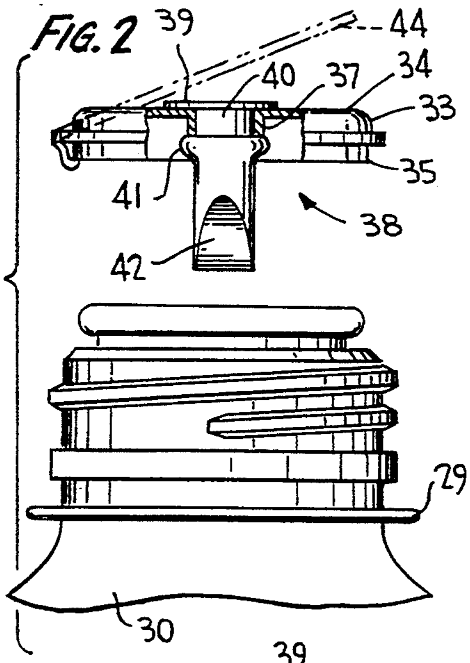
FIG. 2 is an exploded view in elevation of the neck of a bottle and a cap valve constructed in accordance with the present invention and used in cooperation with the dispensing assembly of FIG. 1.
Figure 3:
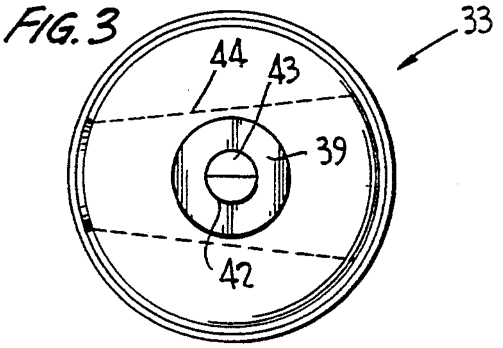
FIG. 3 is a top view in plan of the cap valve of FIG. 2.
Figure 5:
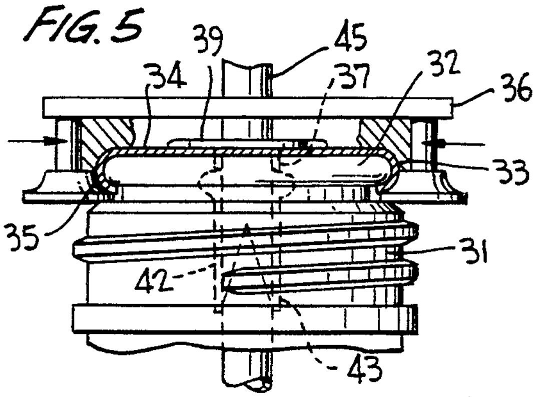
FIG. 5 is a view in elevation of the neck of the bottle of FIG. 1 shown during attachment of the cap valve thereto.
Figure 4:
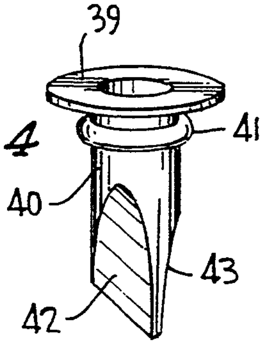
FIG. 4 is a view in perspective of the valve portion of the cap valve of FIG. 2.

After bottle 30 has been filled with a beverage (e.g., a carbonated soft drink for purposes of the present example), the cap valve 33 is placed over the open bottle end, and skirt 35 is crimped about peripheral lip 32. A conventional crimping unit 36 is employed for this purpose and, of itself, does not constitute part of the present invention. Once the cap valve is sealed on the bottle, the headspace in the bottle can be pressurized with an inert gas that does not significantly interact with the beverage liquid. The preferred pressurizing gas for this purpose is nitrogen, but other gases may be employed. To effect pressurization of the headspace, a tube 45 has its distal end inserted through duck-bill valve 38 into the headspace above the liquid level. The proximal end of tube 45 is connected to a source (not shown in FIG. 5) of pressurized nitrogen from which the nitrogen may be selectively delivered under pressure into the headspace. Pressure ranges for the nitrogen in the headspace are discussed hereinbelow; for present purposes it should be understood that the nitrogen pressure is sufficient to force all of the beverage liquid from the bottle via siphon tube 13 and the dispensing valve in dispenser head 10. As illustrated in FIG. 5, the nitrogen fill tube 45 may be part of crimping unit 36 so that crimping of the cap valve and pressurization of the headspace can be effected at the same station in the .bottling assembly line. Alternatively, nitrogen pressurization may occur at a subsequent location in the assembly line in which case tube 45 would not be part of the cap crimping unit.

Once the headspace has been charged with nitrogen under pressure, an overcap 46 is secured over cap valve 38 onto the threaded neck 31 of the bottle. Overcap 46 is preferably made of lightweight aluminum and formed with internal threads for engaging the threads on bottle neck 31. It is also preferred that overcap 46 be tamper-proof, recyclable and disposable, such overcaps being conventional in the beverage bottling industry. Unlike such conventional caps, however, overcap 46 is not subjected to the pressure from the bottle interior during transportation and storage. Once removed, the overcap may be threaded back onto neck 31, a feature that will be advantageous if dispenser head 10 is not employed by the consumer but, instead, the beverage is conventionally poured from the bottle at different times after the tear away section 44 is removed.

Figure 6:
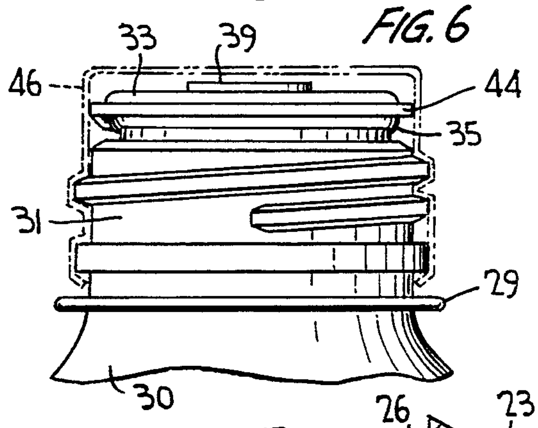
FIG. 6 is a view in elevation of the bottle neck of FIGS. 2 and 5 showing the cap valve attached thereto and a protective overcap attached over the cap valve.

The capped and sealed bottle, as it appears in FIG. 6, is transported from the bottling plant, eventually reaching appropriate retail outlets where the bottle is purchased by a consumer. Such consumer would also purchase a reusable dispenser head 10 (FIG. 1). When the consumer is ready to dispense liquid from bottle 30, overcap 46 is removed to expose cap valve 33, the bottle remaining sealed by the cap valve. With valve member 19 in its closed position, the bottom end of siphon tube 13 may be inserted through duck-bill valve 38 and extended to the bottom of bottle 30 while attachment cylinder 11 of the head member is threadedly engaged to the neck 31 of the bottle. It is contemplated that the head member will remain thusly secured to the bottle until all of the bottle contents have been dispensed, although it is certainly possible to remove the dispensing assembly from the bottle at any time without compromising sealing of the bottle. To dispense liquid from the bottle it is only necessary to rotate knob 23 in a direction to move valve member 19 away from inlet port 16 a sufficient distance until a flow rate satisfactory to the consumer is achieved through spout 28 and into a glass. The bottle headspace pressure created by the nitrogen gas forces liquid from the bottom of the bottle up through the siphon tube 13. In this regard, the length of siphon tube 13 is chosen to extend to the bottom of the bottle. Liquid under pressure flowing through siphon tube 13 and passage 14 impinges on the tip 27 of valve liner 25 where, as described above, a stagnation point is created. The liquid then flows through the space between valve liner 25 and the wall of valve chamber 15. This flow space is annular in cross-section and gradually increases in cross-sectional area as the flow proceeds downstream. The flow is thus diffused over the length of the valve member 19 rather than being suddenly exposed to ambient pressure as in prior art valves. Consequently there is little if any foaming of the carbonated beverage flowing through spout 28 into a glass.

Figure 7:
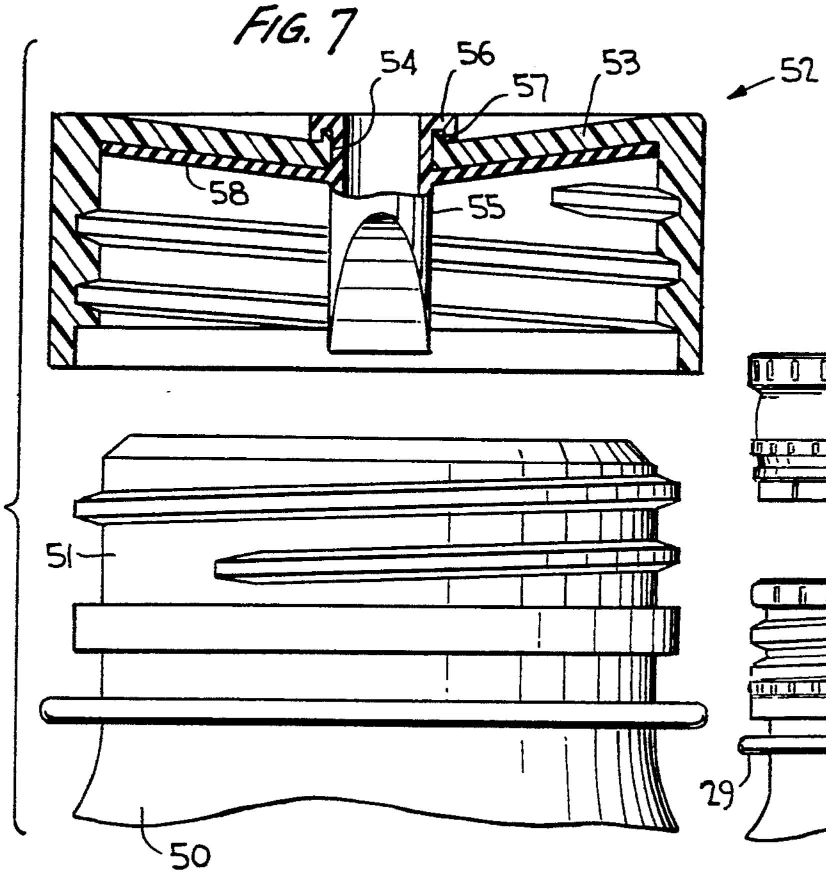
FIG. 7 is an exploded view in elevation and partial section of a bottle neck and an alternative cap valve constructed in accordance with the present invention and adapted to be secured to the bottle neck.
Figure 8:
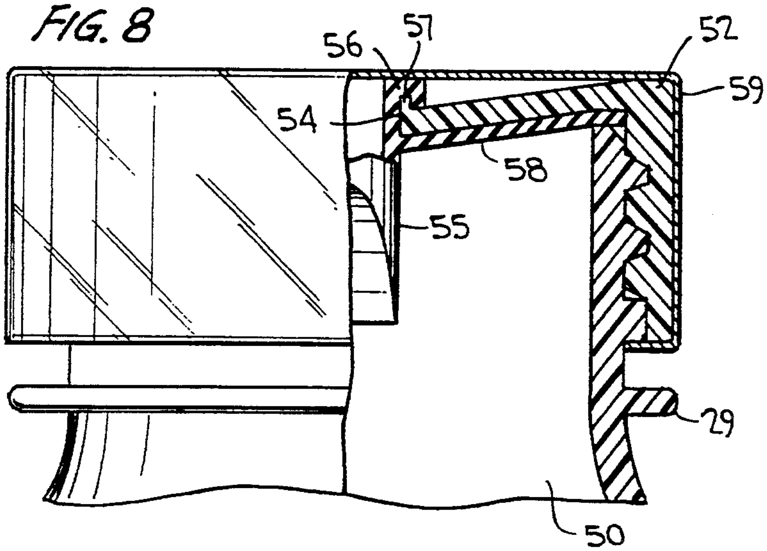
FIG. 8 is a view in elevation and partial section of the bottle neck and the cap valve of FIG. 7 as finally assembled.

An alternative cap valve and bottle neck structure is illustrated in FIGS. 7 and 8 to which specific reference is now made. This cap valve structure would typically be used with the dispensing heads illustrated in FIGS. 11 and 12, for example, as described below. Bottle 50 is similar to bottle 30 but does not have a radially protruding peripheral lip at its open end. The bottle neck 51 is appropriately externally threaded to be engaged by a cap. In this embodiment the cap valve is built into a plastic cap 52 adapted to threadedly engage the bottle neck. In particular, cap 52 has a cup-like configuration with its cylindrical interior threaded to engage the bottle neck. The closed end 53 of the cap slopes funnel-like toward its center so that the outside top surface of the cap is concave and recessed relative to the upper annular edge at the cap periphery. At the center of closed cap end 53 is a through hole 54. A duck-bill valve 55 extends down through hole 54 into the interior of cap 52. This duck-bill valve is made of the same resilient material described for valve 38 but differs somewhat in construction in order to accommodate the configuration of cap 52. Specifically, duck-bill valve 55 has a top annular flange 56 with a depending annular lip resiliently engaging an upstanding annular rim 57 surrounding hole 54 on the top surface of the closed cap end 53. The axial height of flange 56 is such that the flange remains essentially within the concavity of the top of cap 52, thereby permitting an overcap to be disposed on the top of cap 52 without interference from the duck-bill valve. An annular liner 58 extends generally radially from the duck-bill valve 55 along the interior surface of closed cap end 53. Liner 58 serves the dual functions of preventing axial withdrawal of the duck-bill valve upwardly through hole 54 and of sealing the cap against the rim of bottle neck 51 when the cap is tightened onto the bottle. The duck-bill flaps extend below liner 58 and function as described above in relation to valve 38. An overcap 59, typically of thin yieldable sheet metal or plastic, is crimped over cap 52 and bottle neck 51 in tamper-proof relation to protect the cap valve and seal the duck-bill valve during transportation and storage.

Figure 12:
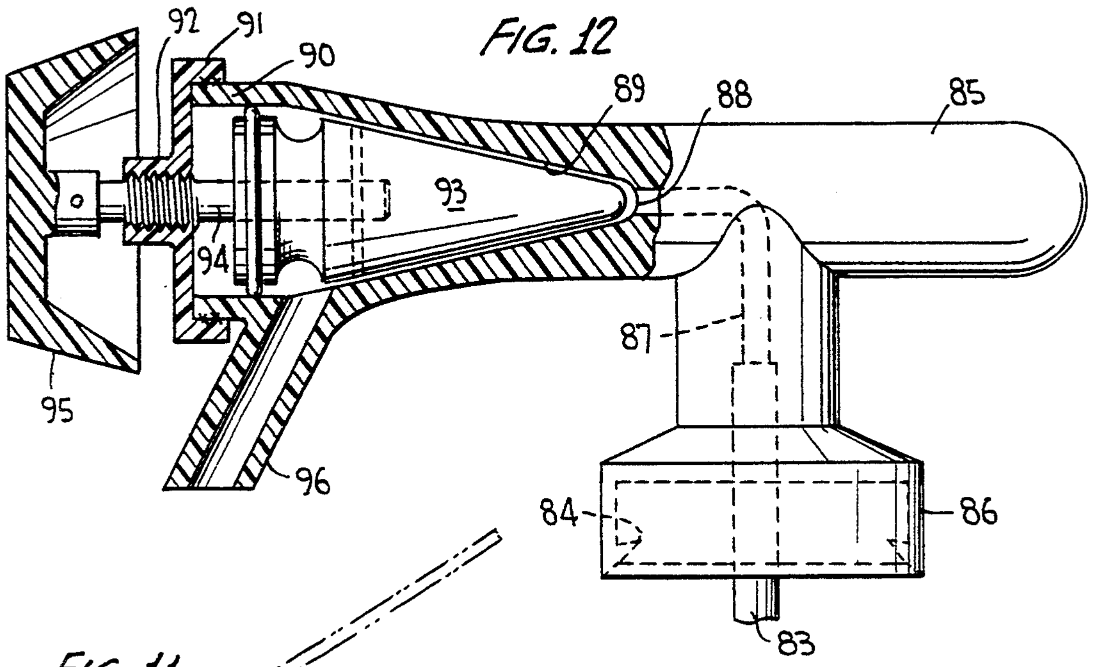
FIG. 12 is a view in elevation and partial section of another alternative dispensing assembly constructed in accordance with the present invention.
Figure 11:
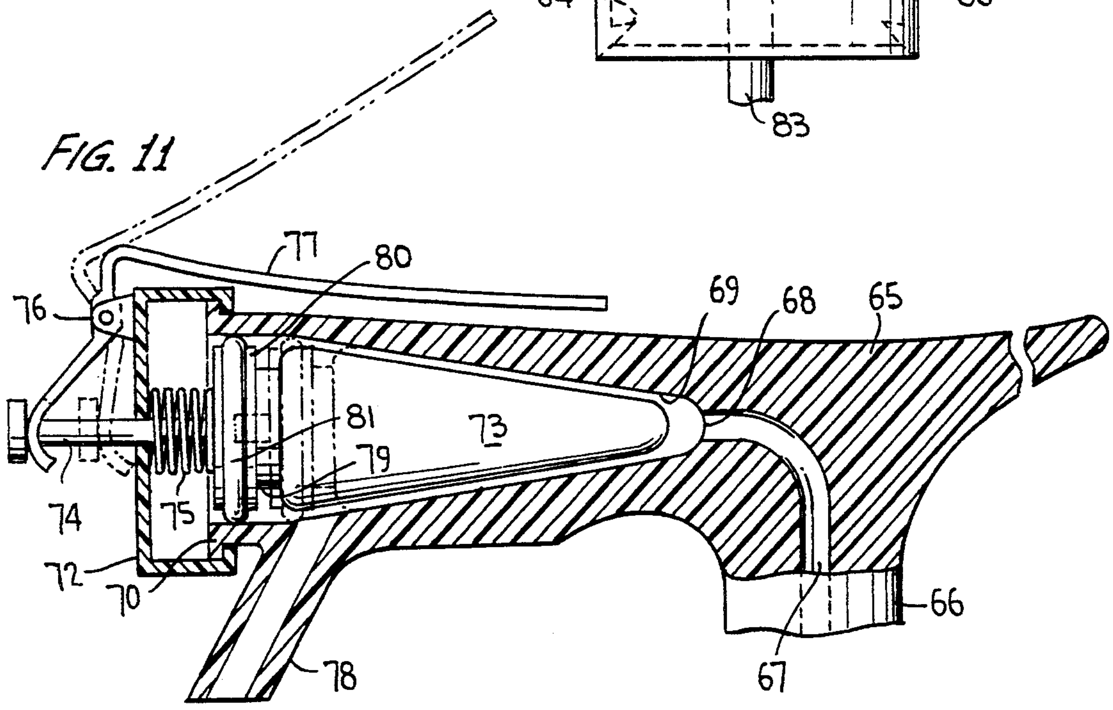
FIG. 11 is an elevational view in section in an alternative dispensing assembly constructed in accordance with the present invention.

When the consumer is ready to dispense liquid from bottle 50, overcap 59 is removed and a dispensing assembly of the type described below in relation to FIGS. 11 and 12 is placed on cap 52. It will be noted that this arrangement permits cap 52 to be removed and the contents of the bottle 50 to be poured in a conventional manner instead of using a dispenser. Bottle neck 51, without the peripheral lip 32 (FIG. 2), conforms to the standard configuration of threaded bottle necks used in the soft drink industry. Further, except for the concave top and through hole 54, cap 52 is otherwise also a standard plastic cap configuration used in that industry.

Figure 9:
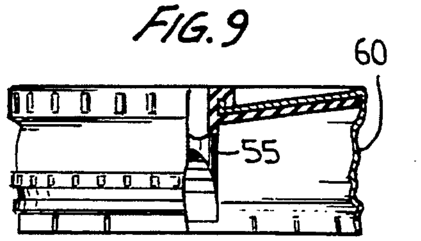
FIG. 9 is a view in plan and partial section of another alternative cap valve constructed in accordance with the present invention.
Figure 10:
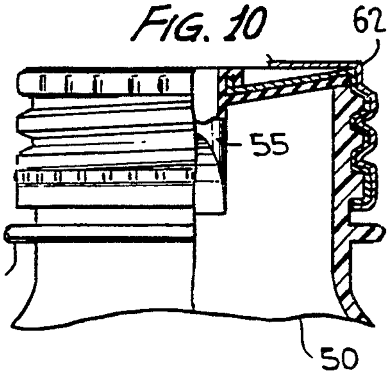
FIG. 10 is a view in elevation and partial section of the cap valve of FIG. 9 secured to the neck of a bottle.

The cap employed with bottle 50 need not be plastic, as described, but instead may be aluminum as illustrated in FIGS. 9 and 10. Aluminum cap 60 is similar to the industry standard aluminum tamper-proof cap adapted to threadedly engage a bottle such as bottle 50. Cap 60 differs from the standard aluminum cap, however, by having the same modifications as cap 52 in order to accommodate duck-bill valve 55. Specifically, the top of cap 60 is concave with a central hole through which duck-bill valve 55 extends. An overcap 62 is placed over the entire cap 60 during transportation and storage to protect the duck-bill valve and seal the passage therethrough.

An alternative dispensing assembly configuration is illustrated in FIG. 11 and includes a head member 65 of plastic, aluminum, or other material suitable for the purposes described herein. The head member is adapted to be removably affixed to the top of a beverage container. For this purpose, head member 65 may include a depending bottle attachment cylinder 66 open at its lower end and having a resilient annular clip (not shown in FIG. 11 but described in relation to FIG. 13) suitable for snap-fit engagement of molding ring 29 on a standard bottle. A siphon tube (not shown in FIG. 11) extends downwardly through attachment cylinder 66 and is secured by adhesive or the like in a suitably provided bore at the upper end of the attachment cylinder interior. In this position the upper end of the siphon tube communicates with one end of a flow passage 67 defined in head member 65. The other end of flow passage 67 terminates at an inlet port 68 defined in the upstream end of generally conical valve chamber 69. Inlet port 68 is defined at the rounded narrow end of valve chamber 69 symmetrically about the longitudinal axis of the chamber; the chamber itself is also symmetrical about its longitudinal axis.

The downstream end of valve chamber 69 has a short generally cylindrical segment that is terminated by an annular lip 70 extending radially outward and adapted to be engaged by an inwardly directed lip 71 of a cover 72. The cover is substantially cup-like in configuration and is provided at its closed end with a central through hole disposed concentric! ally about the longitudinal axis of valve chamber 69.

A generally conical valve member 73 is movable supported in valve chamber 69 coaxially with the chamber with the narrow end of member 73 facing the narrow end of the chamber. Valve member 73 is uniformly spaced from the surrounding walls of chamber 69 and is controllably movable along the longitudinal axis of the chamber. In order to provide such movability, the upstream or wide end of valve member 73 is fixedly secured to a distal end of a shaft 74 extending along the longitudinal axis of the valve chamber through the hole in cap 72. Shaft 74 is free to move longitudinally, within limits, through the cover 72 to correspondingly move valve member 73 longitudinally. A helical compression spring 75 surrounds shaft 74 with its ends abutting cover 72 and a downstream surface of valve member 73 in order to bias the valve member to its closed position. On the outside surface of cover 72 there is secured a pivot support 76 on which is pivotably mounted an actuator 77. The actuator has a short pivot arm extending through and engaged at the proximal end of shaft 74. The opposite and longer pivot arm of actuator 77 is elongated and actuable manually in a manner to cause the short pivot arm to move shaft 74 axially outward from the valve chamber 69 in opposition to the bias force of spring 75. In particular, pivoting of actuator 77 in a clockwise direction (as viewed in FIG. 11) toward the position shown in solid lines causes the downstream end of valve member 73 to compress spring 75 against cover 72. The actuator can be manually held in whatever position achieves the desired flow rate through spout 78. When the actuator is released, spring 75 forces valve member 73 to its closed position with its upstream end abutting and closing off inlet port 68.

Although not illustrated in FIG. 11, a valve liner similar to liner 25 (FIG. 1) may be employed in connection with valve member 73, although this is an optional feature. In the absence of such a liner, valve member 73 has its downstream portion configured with a reduced diameter segment 79 disposed between the conical portion of the valve member and a cylindrical terminal segment 80. The latter has a diameter substantially equal to that of the largest diameter of the conical section, thereby providing an enlarged annular space in the valve chamber surrounding the smaller diameter segment 79. The dispensed liquid, after passing through the diffuser passage between the conical walls of the chamber and the valve member, enters this enlarged space from which it egresses without foaming through spout 78. An 0-ring 81 is disposed about cylindrical terminal segment 80 and slidably abuts the chamber wall to provide a pressure seal precluding flow beyond the 0-ring into cover 72.

Operation of the assembly illustrated in FIG. 11 is the same as that described in relation to the dispensing assembly illustrated in FIG. 1.

Another dispensing assembly embodiment of the present invention is illustrated in FIG. 12 and includes a head member 85 adapted to be removably affixed to the top of a beverage container. For this purpose head member 83 includes a depending bottle attachment cylinder 86 open at its lower end and having a resilient annular clip 84 configured to engage molding ring 29 (FIGS. 1, 2, 6) on a bottle. A siphon tube 83 extends downwardly through attachment cylinder 86 and is secured by adhesive or the like in a suitably provided bore at the upper end of the attachment cylinder interior. In this position the upper end of the siphon tube 83 communicates with one end of a flow passage 87 defined in head 85. The other end of flow passage 87 terminates at an inlet port 88 provided at the upstream end of a generally conical valve chamber 89. Inlet port 88 is defined at the rounded narrow end of valve chamber 89 symmetrically about the longitudinal axis of the chamber; the chamber itself is also symmetrical about its longitudinal axis.

The downstream end of valve chamber 89 has a short generally cylindrical segment 90 that is exteriorly threaded to be engaged by an internally threaded cover 91. The cover is substantially cup-like in configuration and is provided at its closed end with a centrally located sleeve 92 threaded internally to receive a correspondingly threaded exterior portion of a shaft 94 to thereby permit the shaft to be rotated and simultaneously moved axially in the valve chamber.

A generally conical valve member 93 is movably supported in valve chamber 89 coaxially with the chamber with the narrow end of valve member 93 facing the narrow end of the chamber. Valve chamber 93 is uniformly spaced from the surrounding walls of chamber 89 and is controllably movable along the longitudinal axis of the chamber. In order to provide such movability, the upstream or wide end of valve member 93 is fixedly secured to a distal end of shaft 94 extending along the longitudinal axis of the valve chamber through sleeve 92 and cover 91. The proximal end of shaft 94 is secured to a control knob 95 such as by a locking pin in a manner to permit the shaft to be rotated about its longitudinal axis in response to rotation of knob 95 about that axis.

Rotation of knob 95 causes shaft 94 to rotate about its axis and move axially in chamber 89. The valve member 93 thereby rotates about its axis and moves axially in the same chamber. The valve member is thusly movable over a continuous range between two extreme positions, closed and fully open.

Valve chamber 89 is provided with a downwardly directed pour spout 96 having its proximal end communicating with the downstream end of the valve chamber. The preferred location of the proximal end of spout 96 is adjacent a portion of valve member 93 where the valve member is reduced in diameter to increase the volume of the space between the diffuser portion of the valve and the spout. Operation of the valve is the same as described for the embodiment illustrated in FIG. 1.

Figure 13:
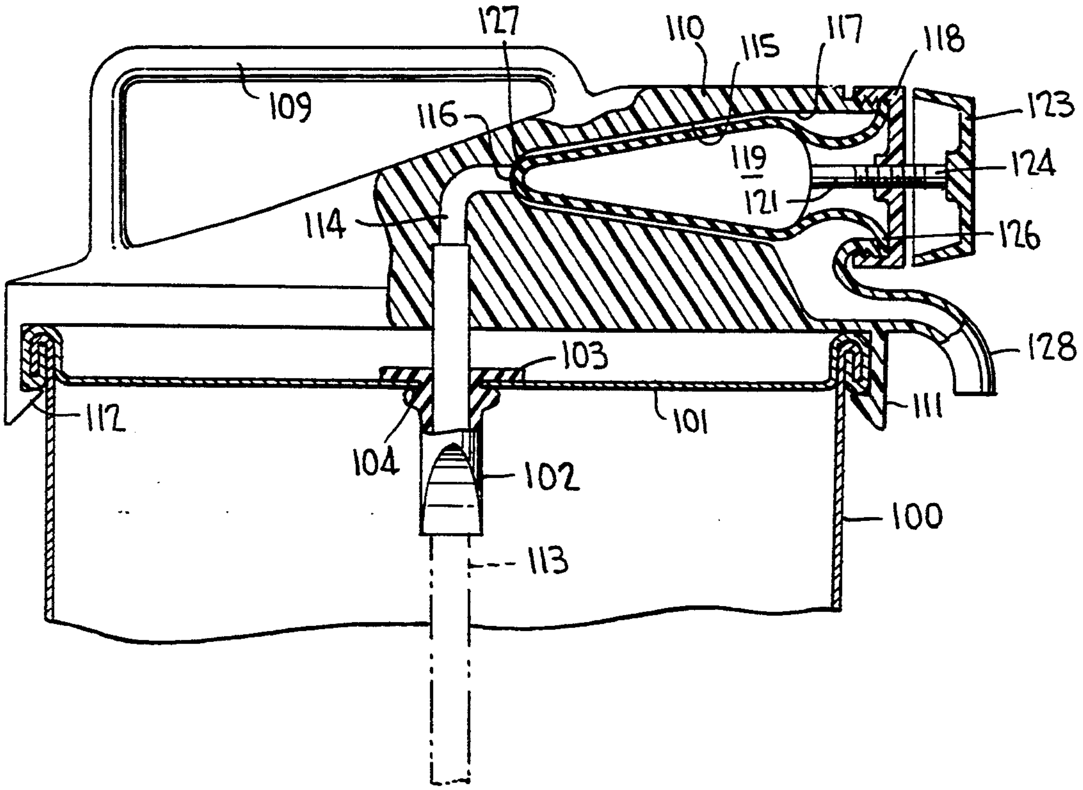
FIG. 13 is a view in elevation and partial section of the top of a beverage-containing can fitted with an alternative cap valve and the dispensing assembly constructed in accordance with the present invention.
Figure 14:
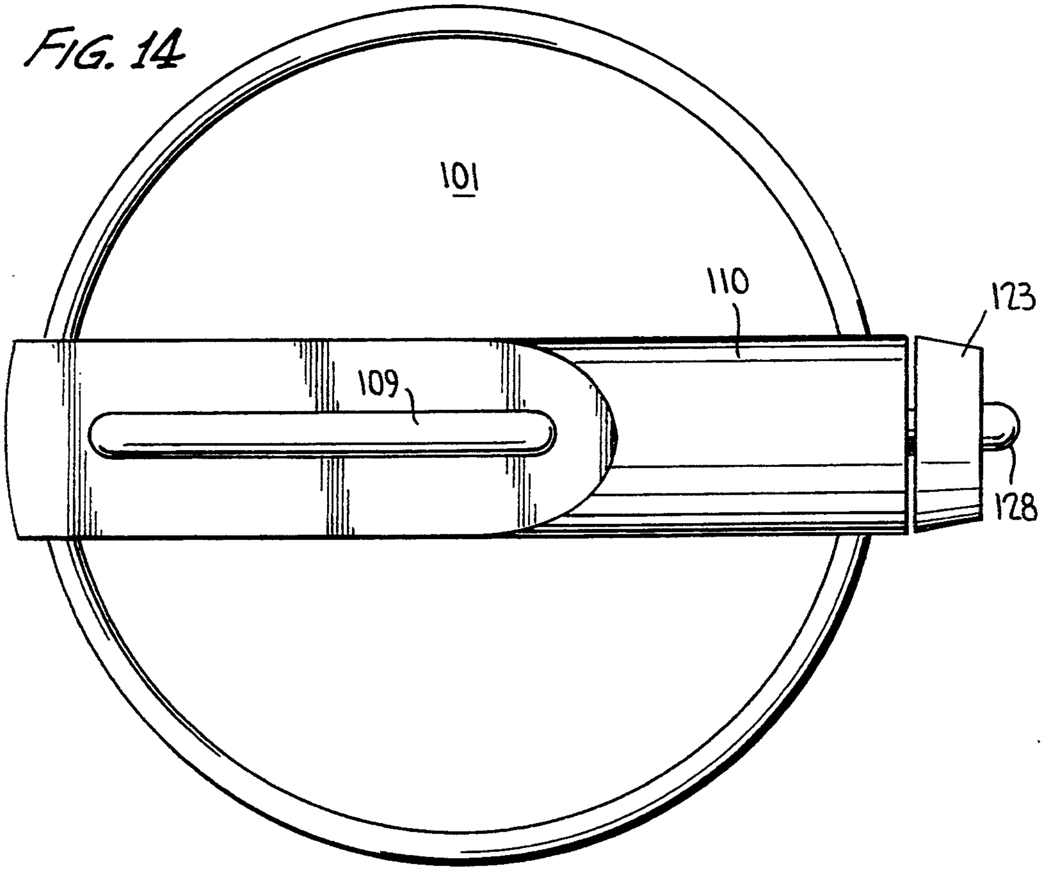
FIG. 14 is a top view in plan of the can and dispensing assembly of FIG. 13.

Although described hereinabove for use with bottles, the dispenser of the present invention is useful with various types of containers. Referring to FIGS. 13 and 14, an embodiment is illustrated for use with a can 100, the top 101 of which has a central through hole adapted to retain a duck-bill valve 102. Can top 101 serves as a permanent cap valve and is initially a flat circular sheet of aluminum or other metal secured to the upper edge of metal can 100 by rolling the annular edges of the can and top together in a conventional manner. Duck-bill valve 102 is configured in a similar manner to valve 38 (FIG. 1) and includes an annular top flange 103 and an annular stop 104 disposed adjacent the top and bottom surfaces, respectively, of can top 101. The duck-bill valve flaps are suspended below can top 101 and seal off communication between the can interior and ambient pressure in the absence of a siphon tube, or the like, extending through the valve.

Can 100 is filled with liquid prior to sealing top 101 thereto. Pressurization of the can headspace with nitrogen (or other inert gas) may be effected at a can top attachment station or thereafter in a manner similar to that described above. The can is typically transported and stored with a plastic overcap (not shown) disposed over the can top 101 to protect the duck-bill valve 102.

A dispensing assembly for can 100 according to the present invention includes a head member 110 having a handle 109. Head member 110 is an elongated member adapted to be removably affixed atop can 100 in a position extending diametrically along the can top. For this purpose, head member 110 includes a depending attachment cylinder 111 open at its lower end and having a resilient annular clip 112 adapted to engage the rolled annular edges of can 100 and top 101. A siphon tube 113 extends downwardly through attachment cylinder 111 and is secured by adhesive or the like in a suitably provided bore at the upper end of the attachment cylinder interior. In this position the upper end of siphon tube 113 communicates with one end of a flow passage 114 defined in head member 110. The other end of flow passage 114 terminates at an inlet port 116 at the upstream end of a generally conical valve member 115. Inlet port 116 is defined at the rounded narrow end of valve chamber 115 symmetrically about the longitudinal axis of the chamber; the chamber itself is also symmetrical about its longitudinal axis.

The downstream end of valve chamber 115 has a short generally cylindrical segment 117 threaded exteriorly to be engaged by an internally threaded cover 118. The cover is substantially cup-like in configuration and is provided at its closed end with a threaded central through hole disposed concentrically about the longitudinal axis of valve chamber 115. A sleeve extends inwardly from that hole and is similarly internally threaded continuously with the through hole threading.

A generally conical valve member 119 is movably supported in valve chamber 115 coaxially with the chamber, the narrow end of member 119 facing the narrow end of the chamber. Valve member 119 is uniformly spaced from the surrounding walls of chamber 115 and is controllably movable along the longitudinal axis of the chamber. In order to provide such movability, the upstream or wide end of valve member 119 has a bore defined therein to a predetermined depth along the longitudinal axis of the valve member. The bore engages the distal end of a shaft 121 threadedly engaged in the through hole and sleeve of cover 118. The proximal end of shaft 121 is secured to a control knob 123 in a manner to permit shaft 121 to be rotated about its longitudinal axis in response to rotation of knob 123 about that axis.

A generally conical hollow valve member liner 125 made of suitably soft and resilient plastic material is secured to valve member 119 by means of a suitable adhesive. The valve liner surrounds the upstream end and conical surface of the valve member in flush fitting relation. The open end of valve liner 125 located downstream of valve member 119 converges and then diverges in a downstream direction to increase the spacing between that portion of the liner and the wall of valve chamber 115. The open end 126 of valve liner 125 forms an annular lip that is compressed and engaged between cover 118 and the annular end of body 110, thereby preventing rotation of liner 125 and valve member 119 about the valve chamber axis.

Rotation of knob 123 rotates shaft 124 about its axis causing the valve member 119 and its liner to move axially in chamber 115. The valve member is thus movably over a continuous range between two extreme positions, closed and fully open. In the closed position tip 127 of liner 125 is urged axially against valve inlet port 116 in sealing relation. In the fully open position of the valve, liner tip 127 is axially displaced downstream from inlet port 116 to permit flow through the inlet port into the valve chamber.

The valve chamber is provided with a downwardly directed pour spout 128 having its proximal end communicating with the downstream end of the valve chamber. The preferred location of the proximal end of spout 128 is the enlarged space adjacent the portion of valve liner 125 where the liner converges on itself downstream of valve member 119.

An example of the method of the present invention is diagrammatically illustrated in sequential steps in respective FIGS. 15 through 20 to which specific reference is now made. A container 130 employed in this example is a plastic spherical container of large capacity (e.g., 7 gallons) commonly employed for beer. For purposes of this example it is assumed that beer is the beverage to be stored in and dispensed from container 130, although the description that follows applies to all beverages, including carbonated and non-carbonated soft drinks.

Initially, as represented by FIG. 15, the container 130 is filled with beer at a filling station in the bottling plant, it being understood that the beer is not filled to the very top of container 130 so that a headspace remains above the beer surface. The filling mechanism can be any conventional mechanism employed in the beer industry. In FIG. 16 a cap valve 131 is placed on and secured to the top of container 130 by an appropriate mechanism (e.g., mechanism 36 of FIG. 5) at a subsequent station in the assembly line. Cap valve 131 may be the structure illustrated in FIGS. 2 through 6 with or without the tear-away portion of the cap. Alternatively, cap valve 131 may take the form of any other cap valve described herein or the container closures illustrated and described in U.S. Pat. No. 3,592,351 (Johnson) the disclosure in which is expressly incorporated herein in its entirety. In this regard, the Johnson container closures or their equivalent may be employed as the cap valve structure in any of the embodiments described herein. It should be noted that the Johnson container closure employs a resilient flapper valve serving the same function described herein for the duck-bill valve; accordingly, that flapper valve may be employed instead of the duck-bill valve in accordance with the present invention. In securing cap valve 131 to container 130 a depending skirt (or gripping tabs as disclosed in the Johnson patent) is crimped about an annular peripheral lip 121 (FIG. 15) formed at the upper end of container 130.

Once the cap valve 131 has been secured and seals the container, nitrogen is delivered into the headspace through a fill tube 133 inserted through the cap valve 131. In the embodiment illustrated in FIG. 17, the nitrogen is supplied in gaseous form under pressure to pressurize the headspace as necessary to dispense all of the beer or other beverage from the container. The requirements for such pressure are described in detail below. For present purposes, fill tube 133 extends through the duck-bill or flapper valve in sealing relation so that no fluid can escape through that valve about the fill tube periphery. When the headspace has been appropriately pressurized with nitrogen gas, fill tube 133 is removed and a protective overcap 134 (FIG. 18) is secured to the container in tamper-proof relation to protect the cap valve during transportation and storage. The sealed and protected container can then be shipped and stored without loss of pressurization.

When container 130 has been purchased by a consumer or a commercial establishment and is ready to have its contents dispensed, a dispensing assembly 135 is attached to the container neck with its siphon tube 137 extending to the bottom of the container. The particular dispensing assembly illustrated in FIG. 20 corresponds substantially to dispensing head 110 illustrated in FIGS. 13 and 14; however, any dispensing head embodiment constructed in accordance with the present invention may be employed. Dispensing assembly 135 permits selective dispensing of beer from container 130 without excessive foaming and without loss of pressurization in the container as the beer is dispensed.

An alternative arrangement for dispensing the beer from container 130 is illustrated in FIG. 21 wherein dispenser 135 is secured atop a counter 136 and its siphon tube 137 extends through a hole in the counter. Flexible tubing 138 is secured to the lower end of siphon tube 137 and extends to a further tube 139 secured in cap valve 131 and extending to the bottom of container 130. Tube 139 thusly serves, with tubing 138 and 137, as a delivery path for beer from the container to the throttling and diffusing valve in dispenser 135. This arrangement is particularly useful for commercial establishments wherein the large capacity container 130 can be stowed out of sight below counter 136 and only the dispenser head is visible to the public. When container 130 is empty it is replaced with a new container that is connected to the reusable tube 139, tubing 138, tube 137 and dispensing assembly 135.

It is to be understood that the filling, sealing, pressurization and dispensing steps described above apply to any size container and any type of liquid to be dispensed from that container.

Figure 22:
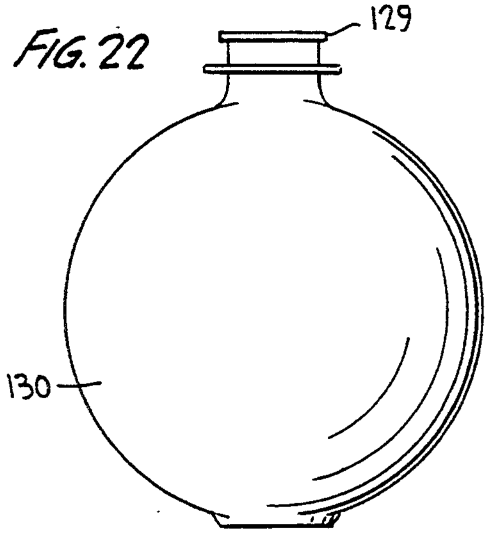
FIG. 22 is a view in elevation of another beverage container with which the methods of the present invention may be employed.
Figure 23:
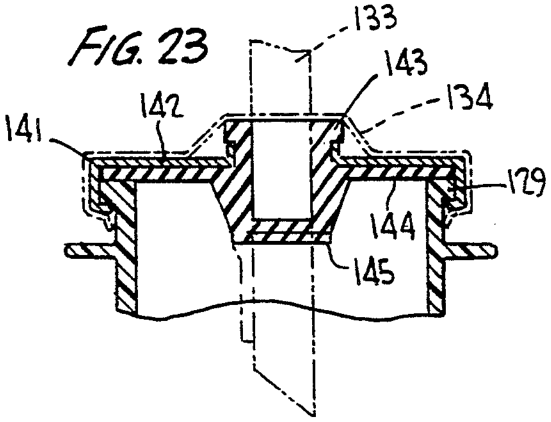
FIG. 23 is an elevational view in section of the neck of the container of FIG. 22 fitted with a cap valve in accordance with the present invention.

Spherical container 130 is illustrated in greater detail in FIG. 22 and, as noted above, is a high capacity container suitable for storing beer, soft drinks, and the like. A detailed view of a cap valve 141 applied to annular lip 129 of container 130 is provided in FIG. 23. Cap valve 141 is of the type described above as being disclosed in the aforementioned Johnson patent and includes a rigid metal or plastic top plate 142 of circular configuration with a depending peripheral skirt adapted to be secured to lip 129 of the container. An elastomeric sealing plug 144 is placed adjacent the bottom surface of plate 142 and includes a hollow portion 143 projecting through a central hole in plate 142 so as to be accessible from above the plate. Integrally formed with plug 144 is a hinged flapper 145 disposed at the bottom of hollow portion 143 in a position to normally seal the bore defined axially through the hollow portion. Pressure inside the container, being greater than atmospheric pressure, urges flapper 145 into its closed or sealing position against the bottom of plug 144. The flapper may be flexed, however, by fill tube 133 inserted through the hollow portion 143 of the plug to push the flapper away from the bottom of the bore about its elastomeric hinge. The bore is sized to receive fill tube 133 in close fitting relation to prevent leakage of pressurized fluid from the container interior during nitrogen filling of the container headspace.

It is to be noted that the description provided hereinabove in relation to FIGS. 15–23 assumes that the headspace is pressurized by forcing nitrogen gas under pressure through the cap valve. It is also possible to place liquid nitrogen into the headspace. This may be done through the cap valves 131, 141 in the same manner described above for gaseous nitrogen; alternatively, liquid nitrogen may be dropped into the headspace prior to placing the cap valve on the container. In either case, the liquid nitrogen placed in the container at very low temperature quickly becomes gaseous and expands as it experiences a rapid temperature increase.

Figure 24:
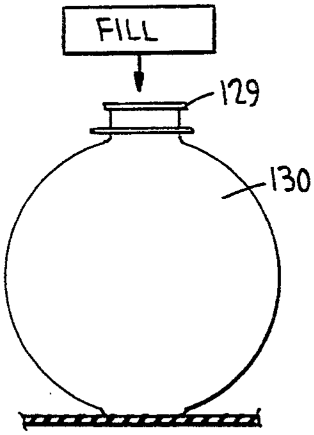
FIGS. 24–28, inclusive, are diagrammatic illustrations of respective steps in an alternative filling, pressurizing, sealing and dispensing process according to the present invention.
Figure 25:
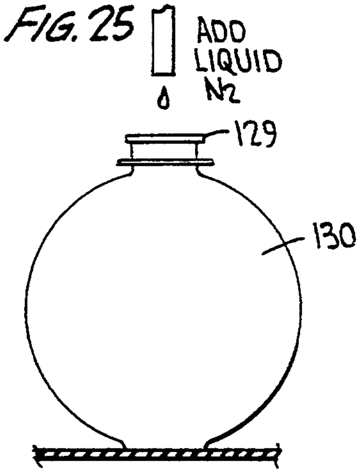
Figure 26:
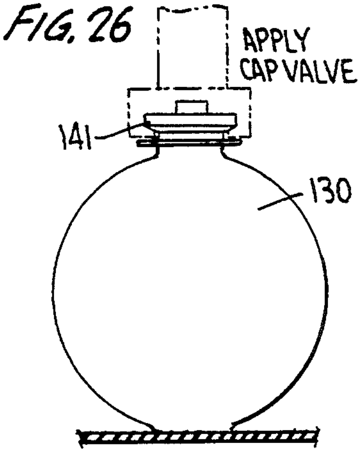

An example of a process wherein the nitrogen is added to the headspace in liquid form is diagrammatically illustrated in FIGS. 24–28. As illustrated in FIG. 24, the beverage to be dispensed is placed in container 130 to the desired level. Thereafter, at the same or a different station in the assembly line, an appropriate quantity of liquid nitrogen is placed in the headspace. This placement of liquid nitrogen in the headspace may be done at the same location at which the cap valve 141 is secured to the top of container 130. Although not illustrated in FIGS. 24–28, once the cap valve has been secured in place to seal the pressurized interior of container 130, a protective overcap may be applied to the container.

Figure 27:
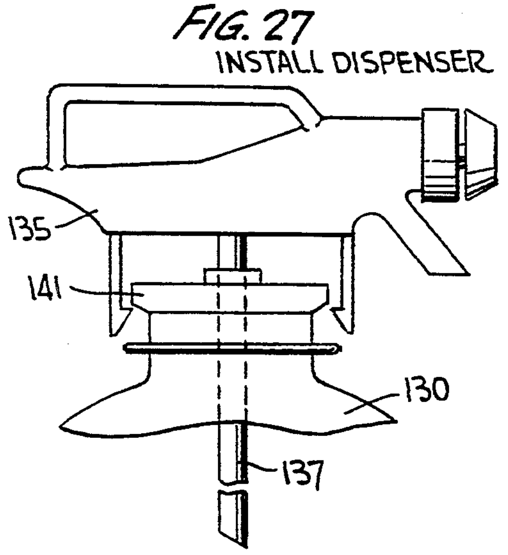
Figure 28:
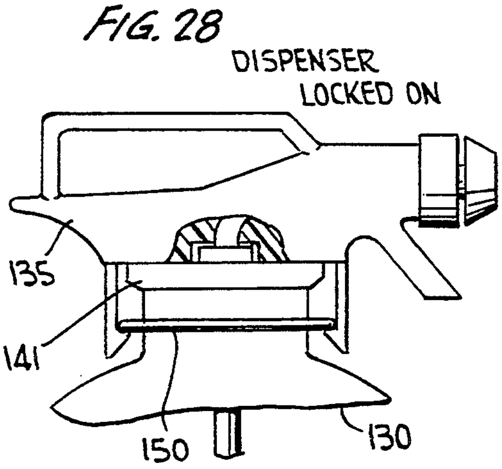

The dispenser assembly is applied to the container by first inserting siphon tube 137 through cap valve 141 as illustrated in FIG. 27. It is important that insertion of the siphon tube 137 be done when the internal throttling and diffusing valve of dispenser 135 is closed in order to prevent escape of pressure as the siphon tube is being inserted. Once the siphon tube has been inserted the dispenser 135 may be secured to the molding ring 150 of the bottle neck (e.g., in snap-fit engagement) as described above. Liquid may then be selectively dispensed from container 130 by actuating the control knob associated with the dispenser to provide the desired opening of the throttling and diffusing valve. Once container 130 has been emptied, dispenser 135 may be removed therefrom and reused with a new filled container.

The dispenser assembly of the present invention is capable of use with container configurations currently employed in the carbonated soft drink, beer, sparkling wine and non-carbonated beverage industries. The methods of the present invention are also consistent with container filling methods currently in use in those industries.

The throttling and diffusing valve employed in the dispenser head of the present invention is unique of itself. It is particularly advantageous for use with naturally foaming liquids such as colas, beer, etc., because it prevents the pressurized liquid from experiencing a rapid drop to atmospheric pressure. The throttling and diffusing valve thus prevents fracturing of carbon dioxide from the liquid as would cause massive foaming that typically results in loss of eighty percent or more of the carbonation in the liquid. There are two primary features of the valve that permit this desirable result to be achieved. First, the flow path through the valve gradually increases in cross-sectional area at successive downstream locations. More specifically, and referring again to the valve in FIG. 1 by way of example, the exterior surface of valve member 19 and the wall of valve chamber 15 are conical, preferably with the same divergence angle. For any given open or partially open position of the valve, the flow path defined between these walls is annular. If, as preferred, the divergence angles of the walls are the same, the spacing between the walls remains the same at successive downstream locations of the flow path. Accordingly, the radial dimension of the annular flow path does not change as a function of downstream travel of the liquid. Instead, there is only one degree of dimensional change with such downstream travel, namely the circumferential dimension increases as the median diameter of the cross-sectional annulus increases. This permits a very gradual increase in the cross-sectional area of the flow path as a function of downstream travel of the liquid. This, in turn, permits the pressure of the liquid to be reduced very gradually along the flow path, thereby avoiding sudden reduction to atmospheric pressure that produces fracture and foaming.

Of course, for some applications it is possible to permit the valve chamber wall to diverge at a slightly greater angle than the valve member to thereby increase the cross-sectional area in two dimensions simultaneously as a function of downstream liquid travel. Also, the conical configurations of the chamber and valve are most desirable but not mandatory, it being understood that ovate or polygonal configurations, or the like, may be employed, albeit less desirably.

The second important aspect of the throttling and diffusing valve is the stagnation point created at its upstream end. This is provided by the rounded configuration of the upstream end of valve member 19 which effectively converts the dynamic pressure (i.e., the velocity head) in the liquid to static pressure (i.e., pressure head). This conversion is achieved with no turbulence and hence no fracturing of gas out of the liquid. Accordingly, the liquid neither foams nor froths to a significant degree. Under the impetus of the static pressure, the liquid flows gently around the rounded end of the valve member into the gradually enlarging flow path wherein the pressure drops gradually. After passing through the diffusing flow path the liquid, at substantially atmospheric pressure, collects in the enlarged area at the downstream end of the valve member and falls out of the pour spout. This is entirely opposite to prior art dispensers wherein the egressing liquid has a high dynamic pressure and impacts forcefully into a glass to increase the foaming action produced by prior fracturing of gas out of the liquid due to sudden exposure of the pressurized liquid to atmospheric pressure.

Although the distance between the valve member 19 wall and chamber wall 15 remains constant throughout the flow path for any given valve setting (again, assuming equal conical angles), that spacing varies for different valve settings (i.e., for different axial positions of the valve member within the chamber). Specifically, for different pressures in container 30, different valve settings are necessary to provide a different rate of diffusion to achieve a desired flow rate through spout 28. The pressure in the container decreases as liquid is dispensed since the volume of the headspace increases and the nitrogen, in occupying the larger volume, experiences a decrease in pressure. For lower headspace pressures the valve must be opened wider to achieve a particular flow rate of the dispensed liquid. A wider opening is achieved by axially displacing valve member 19 further downstream from inlet port 16 so as to increase the transverse spacing between the valve member and the chamber wall.

The initial pressurization level of the headspace depends on the liquid to be dispensed (e.g., its viscosity, carbonation versus non-carbonation, etc.), the pressure that the particular container can withstand (e.g.,° aluminum cans can withstand greater internal pressures than can plastic bottles), and the delivery flow rate desired for the dispensed liquid. As previously noted, the desired flow rate for cola or similar naturally foaming carbonated soft drinks is between 1.5 and 2.0 ounces per second. The desired carbonation pressure for such beverages at room temperature is in the range of 26 to 50 psi. In order to achieve the desired flow rate for such a beverage, an initial nitrogen pressure of approximately 38 psi (at room temperature) is sufficient. More particularly, carbonation is effected at lower temperatures on the order of 34° F. At that temperature a carbon dioxide carbonation pressure of 22 psi results in a carbonation pressure of approximately 60 psi when the liquid later warms to room temperature (approximately 74° F.). If nitrogen pressurization of the headspace is also effected at 34° F., a nitrogen pressure of 38 psi is sufficient to deliver all of the liquid at a flow rate in the desired range. Upon warming to room temperature some of the carbon dioxide comes out of the solution into the headspace below the less dense and lighter nitrogen which has a significantly lower thermal coefficient of expansion. When the container is later chilled by the consumer in preparation for consumption, the nitrogen pushes substantially all of the carbon dioxide from the headspace back into the liquid. Not only does this assure that the proper carbonization pressure is maintained, it also affects the initial carbonization procedure at the bottling plant. In particular, it is common to carbonate beverages at a slightly greater pressure than desired with the recognition that some carbon dioxide will boil out into the headspace after the container is sealed. Without nitrogen in the headspace the carbon dioxide would not be forced back into solution upon subsequent chilling of the container. With the present invention, since the pressurized headspace nitrogen actually forces carbon dioxide from the headspace into the liquid, carbonation can be effected at the actually desired pressure.

Nitrogen is a particularly advantageous gas for pressurizing the headspace because it is plentiful and it does not dissolve in or otherwise interact with beverage liquids. In addition, since the nitrogen maintains a sufficient headspace pressure to dispense all of the liquid, it prevents creation of negative pressure in the container that sometimes occurs with some carbonated beverage dispensing techniques whereby dispensing of liquid is totally prevented.

Table I provides a comparison of carbonation loss experienced in beer dispensed in successive servings using the dispenser of the present invention versus pouring similar servings. Both containers start out with beer at a temperature of 38° F. and a carbonation pressure of 12.0 psi. Each successive set of data represents carbonation pressures measured before a liquid volume corresponding to ten percent of the original liquid has been dispensed or poured. Twenty-four hours were permitted to expire, between each dispensing/pouring. It will be noted in reading data set number three, after only twenty percent of the beer has been dispensed, the carbonation pressure of the beer in the pour container has fallen to 4.49 psi, a level well below the minimum level in the acceptable taste range. The carbonation pressure in the dispenser container is still at 11.60 psi after twenty percent of the beer has been dispensed. In fact, the carbonation pressure remains at 10.29 psi even after ninety percent of the beer has been dispensed in separate servings spaced one day apart. In essence, then, the present invention permits the integrity of the dispensed product to be maintained until substantially all of it has been consumed, and there is no need to discard "flat" beverage.

TABLE I

| Percent of Original Liquid Contents Remaining in Container | DISPENSER Pressure of Liquid in Container (psi) | POURED Pressure of Liquid in Container (psi) |
|---|---|---|
| 100 | 12.00 | 10.52 |
| 90 | 12.00 | 7.82 |
| 80 | 11.60 | 4.49 |
| 70 | 11.13 | 1.58 |
| 60 | 10.54 | |
| 50 | 10.28 | |
| 40 | 10.28 | |
| 30 | 10.28 | |
| 20 | 10.28 | |
| 10 | 10.28 | |

For non-carbonated beverages, such as juice, there is sometimes a tendency to cause frothing in the dispensed liquid when the liquid is pressurized and suddenly exposed to atmospheric pressure. The throttling and diffusing valve of the present invention is highly advantageous in that it avoids such frothing by preventing the sudden exposure of the pressurized liquid to atmospheric air.

By properly selecting the thread size on the actuator shaft associated with knob 23, it is possible to determine the number of turns or partial turns of the actuator required to go from a fully closed position of the valve to a fully open position. In one embodiment, by way of example only, each complete rotation of knob 23 provides one-sixteenth inch linear displacement of valve member 19, and two complete turns are sufficient to bring the valve member from its closed to its fully open position. By "fully open" is meant the position beyond which there is no effective throttling action in the valve. This position is normally reached, to achieve the desired flow rate, after the headspace pressure has dropped to approximately five psi. It should be understood that by proper choice of thread configuration, it is possible to go from fully closed to fully open in the valve with any number of partial or complete turns.

In most beverage dispensing situations, the inner diameter of the siphon tube 13 will fall within a range of one-sixteenth to one quarter inch in order to achieve the desired flow rate. The conical angle of the valve member and chamber wall is typically within the range of 10° to 25° relative to the longitudinal axis of the valve chamber. The axial length of the valve member is typically between three-quarters of an inch to two inches. The inside diameter of the spout 28 typically ranges from three-eighths inch to five-eighths inch. These dimensions are provided by way of example only, it being understood that optimum dimensions are determined for each type of liquid dispensed and the desired flow rate for dispensing that liquid. In this regard, the radius of the rounded tip 27 of the valve member should be selected to provide a maximum stagnation point for the dispensed liquid without producing turbulence.

From the foregoing description it will be appreciated that the invention makes available a novel method and apparatus for effectively dispensing carbonated and non-carbonated beverages at desired flow rates without significant foaming and/or frothing of the dispensed liquid and without loss of carbonation pressure within the storage container in the case of carbonated liquids. In addition, the invention makes available a novel throttling and diffusing valve capable of bringing pressurized liquid to ambient pressure very gradually so as to avoid fracturing gas out of the liquid.

Having described a preferred embodiment of a new and improved method and apparatus for storing and dispensing liquid in accordance with the present invention, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

What is claimed is:

1. Apparatus for dispensing liquid from a container having a top end and a headspace above the contained liquid, said apparatus comprising:

a cap valve closing said container and sealing the top end of the container against escape of pressurized fluid from the headspace;

a charge of pressurized gas sealed in said headspace by said cap valve;

a siphone tube having inlet and outlet ends;

an elastomeric check valve mounted in said cap valve for permitting insertion of said siphon tube through the check valve and into the liquid while preventing escape of pressurized gas about the siphon tube exterior;

dispenser assembly means for securing said siphon tube to said container with said inlet end of the siphon tube extending into said liquid proximate the bottom of said container and with the outlet of said siphon tube extending upwardly beyond said headspace;

wherein said dispensing assembly includes a manually actuable throttling and diffusing valve connected to the outlet end of said siphon tube, said valve including a restricted flow passage for throttling liquid flowing through the siphon tube and into said valve, said flow passage having a gradually increasing flow cross-section to diffuse flow therethrough by gradually reducing the pressure of the flowing liquid from the container interior pressure to ambient pressure; and wherein said pressurized gas is substantially inert relative to said liquid and is at a pressure sufficient to drive all of said liquid from said container through said siphon tube and said throttling and diffusing valve.

2. The apparatus according to claim 1 wherein said throttling and diffusing valve comprises:

a valve chamber having an inlet port connected to the outlet end of said siphon tube;

a valve member disposed in said chamber and movable over a range of positions from a closed position to an open position, said valve in said closed position blocking flow of liquid into said chamber; and wherein, in each position of said range of positions, said valve member and said chamber define said restricted flow passage a cross-section presented transversely to the flowing liquid that gradually increases in area as the flow proceeds downstream.

3. The apparatus of claim 2 wherein said valve member includes a rounded forward end for establishing a pressure stagnation point in the liquid flowing into said valve chamber via said inlet port, and for guiding flowing liquid around said forward end and into said restricted flow passage, said rounded forward end being disposed to seal said inlet port in said closed position of said valve member.

4. The apparatus of claim 2 wherein said valve chamber has a generally conical configuration diverging in a downstream direction with said inlet port axially disposed at its upstream end, and wherein said valve member has a generally conical configuration and is disposed substantially coaxially in said chamber, wherein said restricted flow passage is defined by space between said valve member and a wall of said chamber and presents a substantially annular cross-section transverse to flow at all points along the flow path, said annular cross-section increasing in circumference at successive downstream locations in said flow path.

5. The apparatus of claim 4 wherein said valve member includes a rounded forward end for establishing a pressure stagnation point in the liquid flowing into said valve chamber via said inlet port, and for guiding flowing liquid around said forward end and into said restricted flow passage, said rounded forward end being disposed to seal said inlet port in said closed position of said valve member.

6. The apparatus according to claim 5 further comprising a downwardly directed spout disposed downstream of said restricted flow passage for receiving liquid from said restricted flow passage and permitting the received liquid to fall from said valve chamber.

7. The apparatus according to claim 5 wherein said valve member comprises a rigid body surrounded by a resiliently compressible liner.

8. The apparatus according to claim 5 further comprising an actuator operable by hand for selectively moving said valve member toward and away from said inlet port.

9. The apparatus of claim 5 wherein said elastomeric check valve is resiliently biased closed to seal said container and is capable of being forced open to permit said siphon tube to be extended therethrough while providing a seal about the siphon tube periphery.

10. The apparatus of claim 9 wherein said pressurizing gas is nitrogen and wherein said beverage liquid is carbonated with carbon dioxide.

11. The apparatus according to claim 1 wherein said pressurizing gas is nitrogen and wherein said beverage liquid is carbonated with carbon dioxide.

12. The apparatus according to claim 1 wherein said throttling and diffusing valve comprises means for establishing a pressure stagnation point immediately downstream of said outlet end of said siphon tube when said valve is open.

13. Apparatus for dispensing pressurized liquid from a container having a top end, said apparatus comprising:

a cap closing and sealing the top of said container;

a siphon tube having inlet and outlet ends, said inlet end extending through said cap and into the liquid in said container; and a manually actuable throttling, and diffusing valve connected to the outlet end of said siphon tube above said cap, said valve including a restricted flow passage for throttling liquid flowing out from said siphon tube and into said valve, said flow passage having a gradually increasing flow cross-section in a downstream direction to diffuse flow therethrough by gradually reducing the pressure of the flowing liquid from the container interior pressure to ambient pressure;

wherein said throttling and diffusing valve comprises:

a valve chamber having an inlet port connected to the outlet end of said siphon tube;

a valve member disposed in said chamber and movable over a range of positions from a closed position to an open position, said valve in said closed position blocking flow of liquid into said chamber;

wherein, in each position of said range of positions, said valve member and said chamber define said restricted flow passage having a cross-section presented transversely to the flowing liquid that gradually increases in area as the flow proceeds downstream;

wherein said valve chamber has a generally conical configuration diverging in a downstream direction with said inlet port axially disposed at its upstream end, and wherein said valve member has a generally conical configuration and is disposed substantially coaxially in said chamber, wherein said restricted flow passage is defined by space between said valve member and a wall of said chamber and presents a substantially annular cross-section transverse to flow at all points along said restricted flow passage, said annular cross-section increasing in circumference at successive downstream locations in said flow passage; and wherein said valve member includes a rounded forward end for establishing a pressure stagnation point in liquid flowing into said valve chamber via said inlet port, and for guiding flowing liquid around said forward end and into said restricted flow passage, said rounded forward end being disposed to seal said inlet port in said closed position of said valve member.

14. The apparatus according to claim 13 further comprising a downwardly directed spout disposed downstream of said restricted flow passage for receiving liquid from said restricted flow passage and permitting the received liquid to fall from said valve chamber.

15. A manually actuable throttling and diffusing valve adapted for connection to the outlet end of a flow path for throttling and diffusing pressurized liquid flowing through the flow path to thereby gradually reduce the pressure of the flowing liquid to ambient pressure, said throttling and diffusing valve comprising:

a valve chamber having an inlet port connected to the outlet end of said flow path; and a valve member disposed in said chamber and movable over a range of positions from a closed position to an open position, said valve in said closed position blocking flow of liquid into said chamber;

wherein, in each position of said range of positions, said valve member and said chamber define a restricted flow passage having a cross-section presented transversely to the flowing liquid that restricts and thereby throttles flow entering said inlet port, and wherein said restricted flow passage gradually increases in area as flow proceeds downstream in said chamber to thereby diffuse the flowing liquid and reduce the pressure thereof to ambient pressure;

wherein said valve chamber has a generally conical configuration diverging in a downstream direction with said inlet port axially disposed at its upstream end, and wherein said valve chamber has a generally conical configuration and is disposed substantially coaxially in said chamber, wherein said restricted flow passage is defined by space between said valve member and a wall of said chamber and presents a substantially annular cross-section transverse to flow at all points along said restricted flow passage, said annular cross-section increasing in circumference at successive downstream locations in said restricted flow passage;

wherein said valve member includes a rounded forward end for establishing a pressure stagnation point in the liquid flowing into said valve chamber via said inlet port, and for guiding flowing liquid around said forward end and into said restricted flow passage, said rounded forward end being disposed to seal said inlet port in said closed position of said valve member.

* * * * *